(12) United States Patent
Özer et al.

(10) Patent No.: US 7,769,955 B2
(45) Date of Patent: Aug. 3, 2010

(54) MULTIPLE THREAD INSTRUCTION FETCH FROM DIFFERENT CACHE LEVELS

(75) Inventors: Emre Özer, Cambridge (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 586 days.

(21) Appl. No.: 11/790,811

(22) Filed: Apr. 27, 2007

(65) Prior Publication Data
US 2008/0270758 A1 Oct. 30, 2008

(51) Int. Cl.
*G06F 12/00* (2006.01)
(52) U.S. Cl. .................. 711/138; 711/119; 711/125
(58) Field of Classification Search .............. 711/138
See application file for complete search history.

(56) References Cited

U.S. PATENT DOCUMENTS 7,103,735 B2 * 9/2006 Iyer ........................ 711/158
2008/0016279 A1 * 1/2008 Clark et al. ................ 711/118
2008/0104329 A1 * 5/2008 Gaither et al. ............. 711/138

OTHER PUBLICATIONS

D. M. Tullsen et al, "Exploiting Choice: Instruction Fetch and Issue on an Implementable Simultaneous Multithreading Processor" Proceedings of the 23$^{rd}$ Annual International Symposium on Computer Architecture (ISCA), May 1996, pp. 191-202.
A. Klauser et al, "Instruction Fetch Mechanisms for Multipath Execution Processors" Proceedings of the 32$^{nd}$ Annual ACM/IEEE International Symposium on Microarchitecture, Nov. 1999, pp. 38-47.

* cited by examiner

*Primary Examiner*—Jack Lane
(74) *Attorney, Agent, or Firm*—Nixon & Vanderhye P.C.

(57) ABSTRACT

A data processing apparatus is provided wherein processing circuitry executes multiple program threads including at least one high priority thread and at least one lower priority thread. Instructions required by the threads are retrieved from a cache memory hierarchy comprising multiple cache levels. The cache memory hierarchy includes a bypass path for omitting a predetermined level of the cache memory hierarchy when performing a lookup procedure for a required instruction and for bypassing said predetermined level of the cache memory hierarchy when returning said required instruction to said processing circuitry. The bypass path is used by default when the requested instruction is for a lower priority thread.

12 Claims, 9 Drawing Sheets

Traditional instruction fetch

Fig. 1 (Prior Art)

Simultaneous fetch at different cache levels

MULTIPLE THREAD INSTRUCTION FETCH FROM DIFFERENT CACHE LEVELS

BACKGROUND OF THE INVENTION

1. Field of the Invention

This invention relates to the field of data processing systems. More particularly, this invention relates to multiple thread instruction fetching from different cache levels of a cache memory hierarchy in a data processing apparatus.

2. Description of the Prior Art

In a system where processing circuitry executes multiple program threads (for example a simultaneous multi-threaded (SMT) processor where multiple threads are executed on a single processor core) performance is generally improved by providing increased instruction fetch bandwidth to supply multiple instructions to the multiple active threads executing in the processing circuitry. Typically, the fetch engine of a SMT processor is shared among the threads in a round-robin manner so that each thread receives a fair share of the instruction fetch bandwidth. This is considered to be a fair scheme when all threads have the same priority.

In a multi-threaded system that is designed for realtime applications, it is common for one thread to have higher priority than the other threads. In such a realtime multi-threaded system, the best way of implementing a multiple threaded fetch mechanism will not be the round-robin policy, since this is likely to degrade the performance of the high priority (HP) thread by lengthening its execution time. Assuming a single HP thread, one simple solution is to assign the full instruction fetch bandwidth to the HP thread at every cycle, and the low priority (LP) threads can only fetch when the HP thread stalls for some reason. However, although this policy keeps the execution time of the HP thread at a minimum, the adverse effect of this policy on the performance of the LP threads is rather undesirable since as a result they may only infrequently fetch and retire instructions. Consequently, the contribution of the LP threads to the overall instruction throughput of the realtime multi-threaded system may be significantly reduced. In practice the overall instruction throughput may not be significantly different from a single threaded processor, since it will be predominantly determined by the HP thread alone.

Hence it would be preferable to provide a multi-threaded system in which both HP and LP threads can fetch simultaneously, so that on the one hand the HP thread is not delayed by the fetching activities of the LP thread and on the other hand the LP thread can generate a greater instruction throughput by fetching in parallel with the HP thread. One solution would be to replicate the instruction cache for each thread to avoid the continual overwriting in a single instruction cache by competing threads (known as "thrashing"), but this option is not a cost effective solution. Alternatively, making the instruction cache multi-ported would allow each thread to fetch independently, however multi-ported caches are known to be very expensive and energy hungry. A further alternative solution would be to partition the instruction cache into several banks such that the HP and LP threads can fetch simultaneously. However, this can have a negative effect on the cache access time, since bank conflicts must be arbitrated before giving access to the instruction cache when two requests try to access the same bank. Since instruction cache access time is usually critical for processor performance, lengthy instruction cache access times are usually avoided by designers. Hence, neither replicated instruction caches nor multi-ported/banked instruction cache designs are likely to be desirable solutions.

SUMMARY OF THE INVENTION

Viewed from one aspect the present invention provides a data processing apparatus comprising: processing circuitry for executing multiple program threads including at least one high priority thread and at least one lower priority thread; a cache memory hierarchy comprising multiple cache levels for storing instructions required for said program threads; responsive to the processing circuitry issuing an access request specifying an address of an instruction required for one of said program threads, the cache memory hierarchy performing a lookup procedure to determine if that instruction is stored within the cache memory hierarchy; and said cache memory hierarchy having a bypass path for omitting a predetermined level of said cache memory hierarchy from said lookup procedure and for bypassing said predetermined level of the cache memory hierarchy when returning said required instruction to said processing circuitry, said bypass path being used by default when said access request is for an instruction required for said at least one lower priority thread.

The present invention provides a bypass path within a cache memory hierarchy, such that when a requested instruction is retrieved from the cache memory hierarchy a predetermined level of the cache memory hierarchy is omitted by default when the instruction has been requested by a low priority thread. This leaves the predetermined level exclusively accessible to instruction access requests from a high priority thread. When the execution time of a high priority thread is critical, such as in a realtime simultaneous multi-threaded processor, the arrangement of the present invention advantageously provides that the predetermined cache memory level will not be accessed by instruction access requests for low priority threads, meaning that if the instruction requested by the high priority thread is present in the predetermined cache level then the access request for that instruction by the high priority thread is guaranteed to proceed without interruption by an access request from a low priority thread. In some embodiments a single bypass path may be used, whereas in other embodiments the bypass path may be provided as separate request and return bypass paths, the bypass request path being used for requests issued by the processing circuitry and the bypass return path being used for instructions returning to the processing circuitry.

It will be appreciated that the present invention can find application in a range of data processing systems. For example, on the one hand the processing circuitry may comprise a single processor core executing the multiple program threads (as for example in an SMT processor), or alternatively the processing circuitry may comprise multiple processor cores, each processor core executing one or more of the multiple program threads, as for example in a chip multiprocessor (CMP) system.

It will be appreciated that the principle of the present invention can be applied whichever level of the cache memory hierarchy is arranged to be bypassed by the bypass path. A particularly useful embodiment of the present invention is when the predetermined level is a cache level that is first accessed during the lookup procedure. Such a cache level is typically known as the level 1 (L1) cache.

The processing circuitry of the present invention may also include fetch circuitry for issuing access requests to the cache memory hierarchy, wherein the fetch circuitry determines for each access request whether the bypass path is to be used or not. Given the multiple program threads being executed by the processing circuitry, it is advantageous to provide fetch circuitry which can administer the issuing of access requests from the processing circuitry to the cache memory hierarchy and in particular determine the manner of lookup in the cache memory hierarchy appropriate to each particular access request. For example, based on the priority of the thread requiring a particular instruction, the fetch circuitry can determine whether the bypass path is to be used or not.

Whilst in the simplest embodiment of the present invention low priority requests always use the bypass path and high priority requests never use the bypass path, the situation may arise where for some reason a currently executing high priority thread stalls, in which case for the duration of that stall it may be advantageous to allow the low priority thread access to the predetermined cache memory level which would otherwise have been skipped. This functionality may be provided by the fetch circuitry such that if at a time an access request is to be issued for an instruction required by the at least one lower priority thread, the at least one high priority thread is stalled, the fetch circuitry causes the lookup procedure for that access request to be performed without use of the bypass path.

Although by default an instruction required for a lower priority thread returns via the bypass path and thus bypasses the predetermined level of the cache memory hierarchy, in one embodiment of the present invention, if when the instruction required for the at least one lower priority thread is being returned by the cache memory hierarchy to the processing circuitry predetermined criteria exist, that instruction is allocated into the predetermined level of the cache hierarchy. The predetermined criteria could for example be an indication that no high priority threads are currently executing on the processing circuitry or that a high priority thread executing on the processing circuitry is currently stalled.

A further embodiment of the present invention is arranged such that the bypass path further comprises a shadow fetch buffer associated with a cache level of the cache memory hierarchy for buffering a cache line read from that cache level in response to a first access request, such that if a subsequent access request specifies an address of an instruction within that cache line, that instruction is returned over the bypass path without requiring a further access to that cache level. Reading a cache line requires significant energy expenditure, particularly for larger cache sizes. By providing a shadow fetch buffer which can buffer a cache line the energy expenditure of the data processing apparatus may be reduced by avoiding the need to re-read a cache line. This arrangement may be particularly useful when sequentially stored instructions are retrieved from a cache line of a given cache level. Rather than repeatedly reading the cache line, the cache line only need be read once for the first instruction and the subsequent instructions may then be read from the shadow fetch buffer.

Further energy saving may be achieved by another embodiment of the present invention wherein instructions required for the at least one lower priority thread, when stored in a further predetermined level of the cache memory hierarchy, are only stored in a first part of the further predetermined level of the cache memory hierarchy, and the lookup procedure only examines the first part of the further predetermined level of the cache memory hierarchy when the access request is for an instruction required for the at least one lower priority thread. Limiting the extent of usage of a further predetermined level of the cache memory hierarchy in this way for a lower priority thread can contribute to the reduction of energy expended in retrieving instructions required for the lower priority thread. This arrangement is particularly suited to a set associative cache, for example an 8-way set associative level 2 (L2) cache. In this example, instructions for a lower priority might only be stored and looked up in four of the ways.

A further embodiment of the present invention is one wherein instructions required for the at least one lower priority thread, when stored in a further predetermined level of the cache memory hierarchy, are preferentially stored in a first part of the further predetermined level of the cache memory hierarchy, the lookup procedure first examining the first part of the further predetermined level of the cache memory hierarchy when the access request is for an instruction required for the at least one lower priority thread, and the lookup procedure only examining a further part of the further predetermined level of the cache memory hierarchy when the access request is for an instruction required for the at least one lower priority thread if the instruction is not found in the first part. This arrangement provides an advantageous compromise between the energy saving gained from only using part of a particular cache level for instructions for lower priority threads and the performance advantages of using the entirety of that cache level.

Another aspect of the present invention provides a data processing apparatus comprising processing means for executing multiple program threads including at least one high priority thread and at least one lower priority thread; cache memory hierarchy means comprising multiple cache levels for storing instructions required for said program threads; responsive to the processing means issuing an access request specifying an address of an instruction required for one of said program threads, the cache memory hierarchy means for performing a lookup procedure to determine if that instruction is stored within the cache memory hierarchy means; and said cache memory hierarchy means having a bypass path means for omitting a predetermined level of said cache memory hierarchy means from said lookup procedure and for bypassing said predetermined level of the cache memory hierarchy when returning said required instruction to said processing circuitry, said bypass path means for use by default when said access request is for an instruction required for said at least one lower priority thread.

Yet another aspect of the present invention provides a method of handling access requests in a data processing apparatus comprising the steps of: executing multiple program threads including at least one high priority thread and at least one lower priority thread; storing instructions required for said program threads in a cache memory hierarchy comprising multiple cache levels; in response to an access request specifying an address of an instruction required for one of said program threads, performing a lookup procedure to determine if that instruction is stored within the cache memory hierarchy; and selectively omitting a predetermined level of said cache memory hierarchy from said lookup procedure and from a path used to return said required instruction, said omitting step being selected by default when said access request is for an instruction required for said at least one lower priority thread.

The above, and other objects, features and advantages of this invention will be apparent from the following detailed description of illustrative embodiments which is to be read in connection with the accompanying drawings.

DESCRIPTION OF EMBODIMENTS

Figure 1:
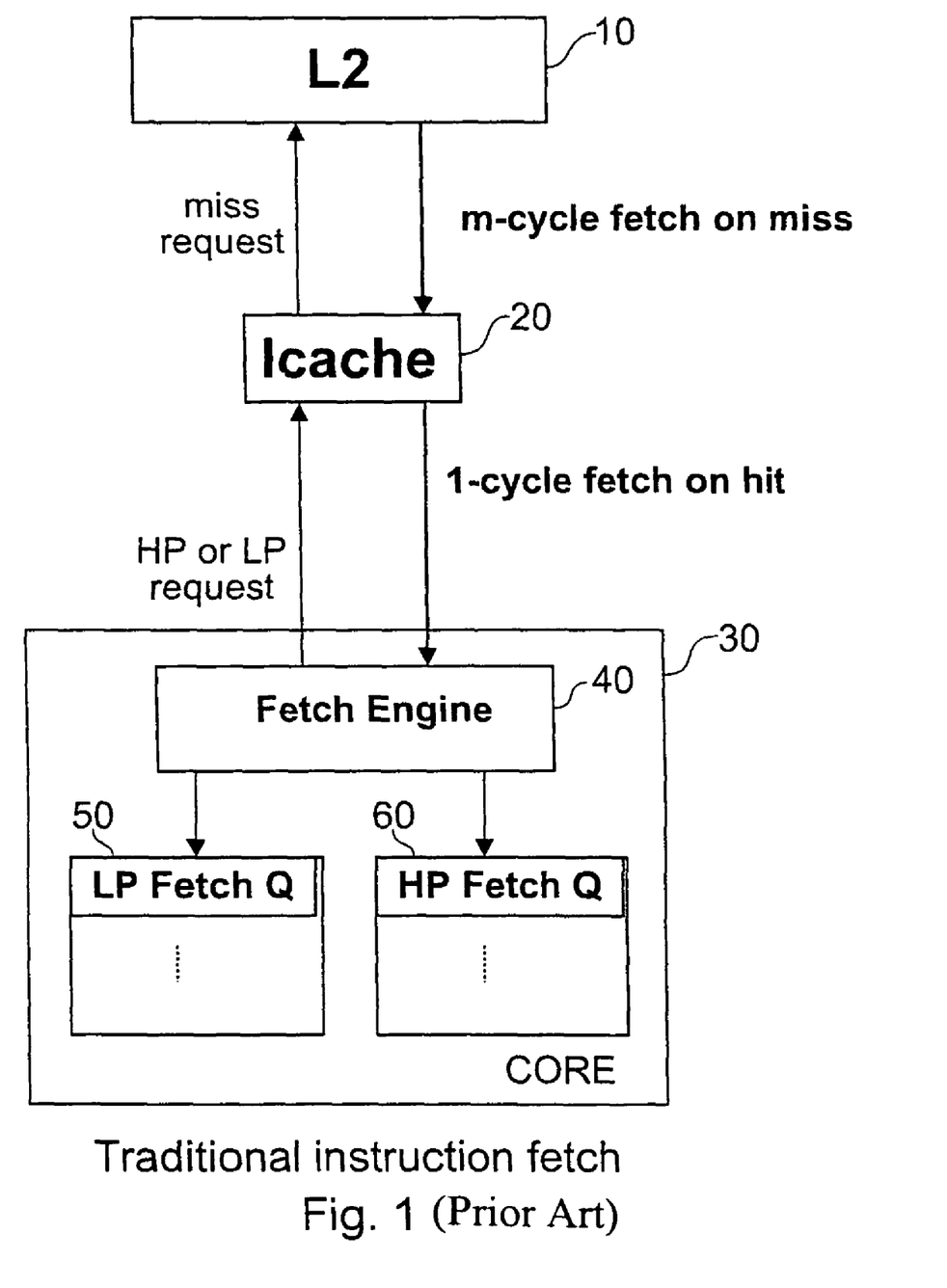
FIG. 1 schematically illustrates traditional instruction fetch from a cache memory hierarchy.

FIG. 1 shows the traditional instruction fetch mechanism in a multi threaded processor. Only one thread can perform an instruction fetch at a time. In a realtime simultaneous multi-threading (SMT) processor, the instruction fetching priority will be arranged in such a way that a high priority (HP) thread has priority to perform instruction fetches over a low priority (LP) thread. The LP thread performs instruction fetches only when the HP thread stalls. In the example of FIG. 1, the cache memory hierarchy comprises a L2 cache 10 and a level 1 cache, which in this example is considered to consist of separate instruction and data caches. In the figures only the instruction cache 20 is shown, as only the instruction fetching aspect will be discussed in detail below.

The processor core 30 comprises a fetch engine 40 which administers the instruction access requests (also referred to herein as fetch requests) sent from the core to the cache memory hierarchy and the requested instructions returned from the cache memory hierarchy to the core. Only one instruction access request can be sent at a time from the fetch engine 40 to the cache memory hierarchy. A request first reaches the instruction cache 20. If the requested instruction is found there then the instruction is returned to fetch engine 40 by the instruction cache 20 (typically in one cycle), fetch engine 40 then passing this instruction to the fetch queue associated with the thread executing in core 30 which requested it. If however the requested instruction is not found in instruction cache 20 then a cache miss occurs, resulting in the instruction access request being passed (typically in the form of a linefill request) further in the cache memory hierarchy to the L2 cache 10. Returning the requested instruction from L2 cache 10 to instruction cache 20 takes multiple cycles, and indeed a cache miss may occur in the level 2 cache resulting in the required instruction being fetched from memory, thereby further increasing the delay.

After an instruction cache miss in the L1 instruction cache 20, the requested instruction returned from L2 cache 10 is allocated to the instruction cache 20. This allocation can take place according to a well-known allocation policy such as "least recently used". Instructions returned from the cache memory hierarchy to the fetch engine 40 are then queued for execution by the thread that requested them, either in LP fetch queue 50 or in HP fetch queue 60. Since the fetch engine 40 prioritises instruction access requests from the HP thread, the performance of the LP thread may be rather poor. Equally, the performance of the HP thread may be impaired by instruction access requests emanating from the LP thread resulting in allocations to the instruction cache 20 which displace instructions required by the HP thread. When this happens there is then a penalty of multiple cycles whilst the instruction required by the HP thread is retrieved from L2 cache 10 and/or memory.

Figure 2:
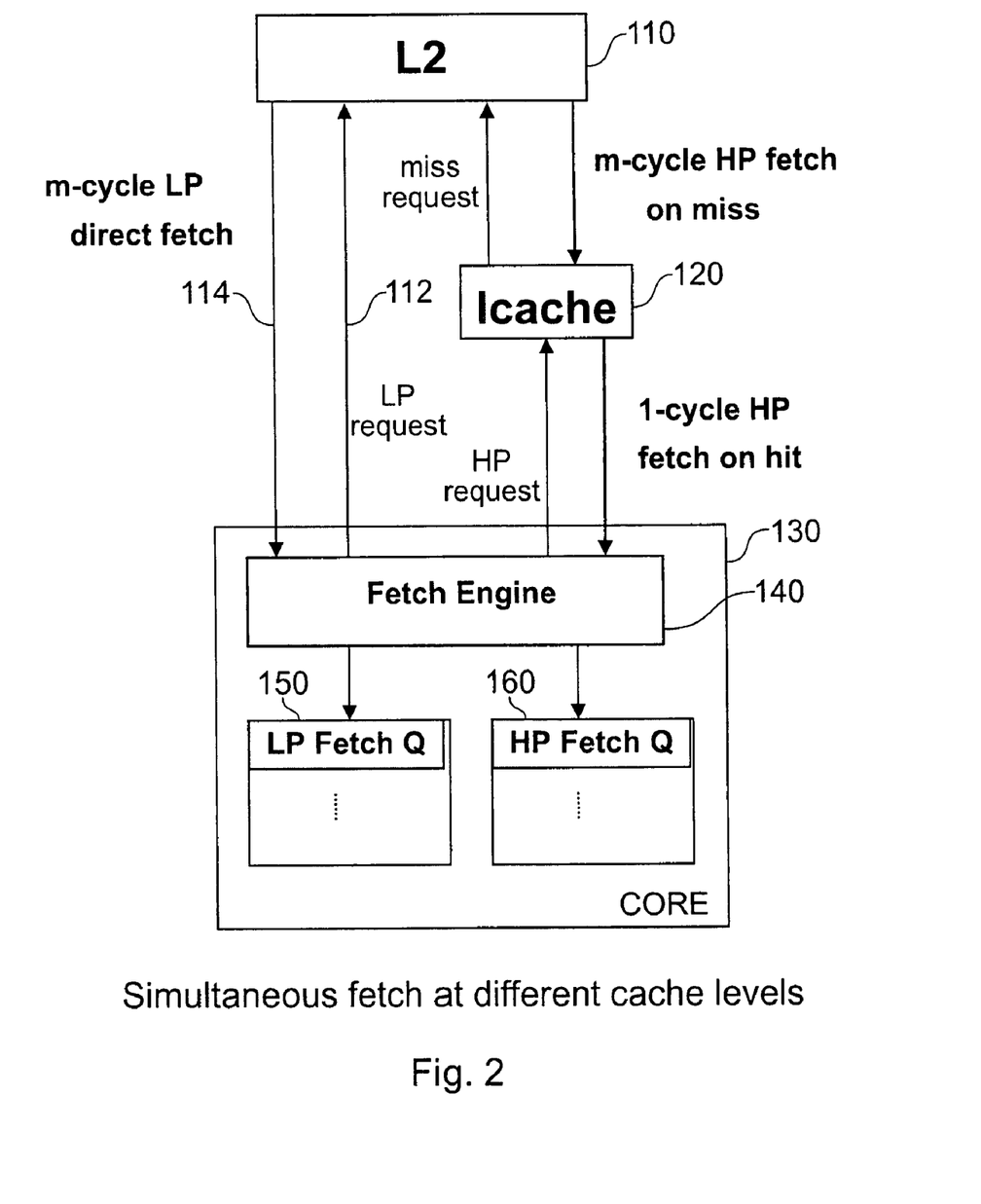
FIG. 2 schematically illustrates simultaneous instruction fetch from different cache levels for low priority thread and high priority thread requests in accordance with one embodiment of the present invention.

FIG. 2 schematically illustrates a simple example implementation of the present invention. This arrangement has the same components as those illustrated in FIG. 1, but the manner in which instruction access requests and returned instructions are passed between them is different. Within the processor core 130 the fetch engine 140 receives instruction access requests for both the HP thread and the LP thread. If an instruction is requested for the HP thread then the fetch engine 140 issues the instruction access request to the instruction cache 120. As in the example of FIG. 1, if this request hits in the instruction cache 120, then in one cycle the instruction is returned to fetch engine 140. If the request misses in the instruction cache 120 then the request is passed on to the L2 cache 110 which then returns the instruction to instruction cache 120 and on to the fetch engine 140. If however an instruction access request is for the LP thread, then fetch engine 140 uses a dedicated bypass request path 112 to send the instruction access request directly to L2 cache 110, from where the instruction is then returned directly via the bypass return path 114 to fetch engine 140. As in FIG. 1, fetch engine 140 passes instructions returned from the cache memory hierarchy to the appropriate instruction queue—LP fetch queue 150 or HP fetch queue 160. This arrangement is referred to herein as a "strict LP L2 instruction fetch mechanism". This mechanism is quite advantageous because the LP thread is running as a background thread, so a multiple cycle direct L2 fetch can be tolerated, whilst the whole bandwidth of the instruction cache is dedicated to the HP thread.

Figure 3:
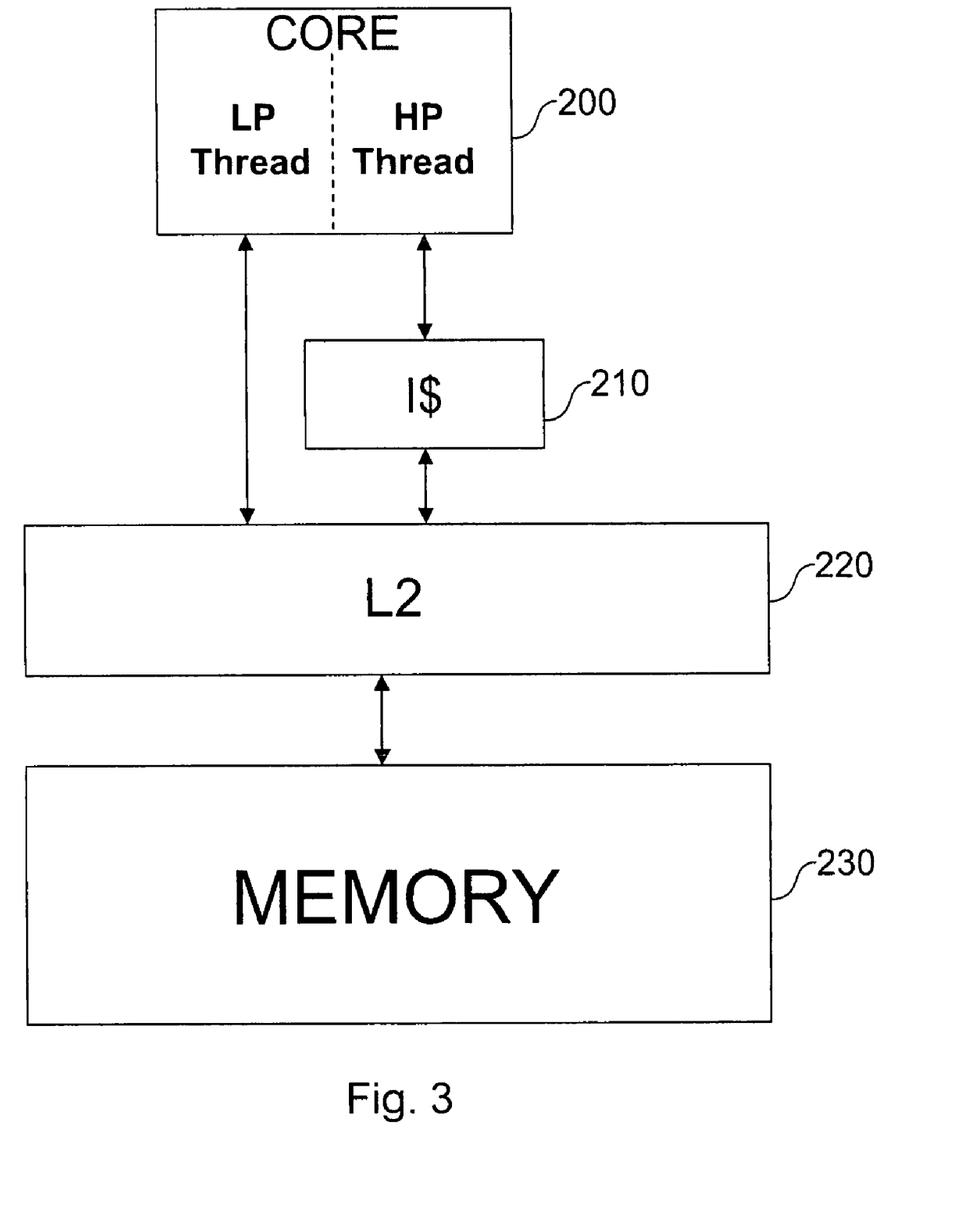
FIG. 3 schematically illustrates the arrangement of a cache memory hierarchy and a single processor core executing a low priority thread and a high priority thread in accordance with one embodiment of the present invention.

FIG. 3 illustrates an SMT processor core 200 arranged to utilise the techniques of embodiments of the present invention. Here, as in the examples of FIG. 1 and FIG. 2, a single processor core 200 is executing both an LP thread and an HP thread. Instruction access requests for the HP thread are passed to the instruction cache 210, and if they miss there, on to L2 cache 220. Instruction access requests for the LP thread are passed directly to L2 cache 220. For either thread if the requested instruction is not found in the L2 cache (i.e. the L2 cache lookup "misses"), then the requested instruction is retrieved from main memory 230. Instructions retrieved from the main memory 230 for the LP thread will be allocated into L2 cache 220 (and bypass the instruction cache 210) as they are returned to the core 200. Instructions retrieved from main memory 230 for the HP thread will be allocated to both the L2 cache 220 and the instruction cache 210 as they are passed back to the core 200.

Whilst the previous figures illustrate example data processing systems where a single processor core is executing multiple threads and a level one (L1) instruction cache is reserved for the HP thread alone, the principle of the present invention is not only limited to such examples.

Figure 4:
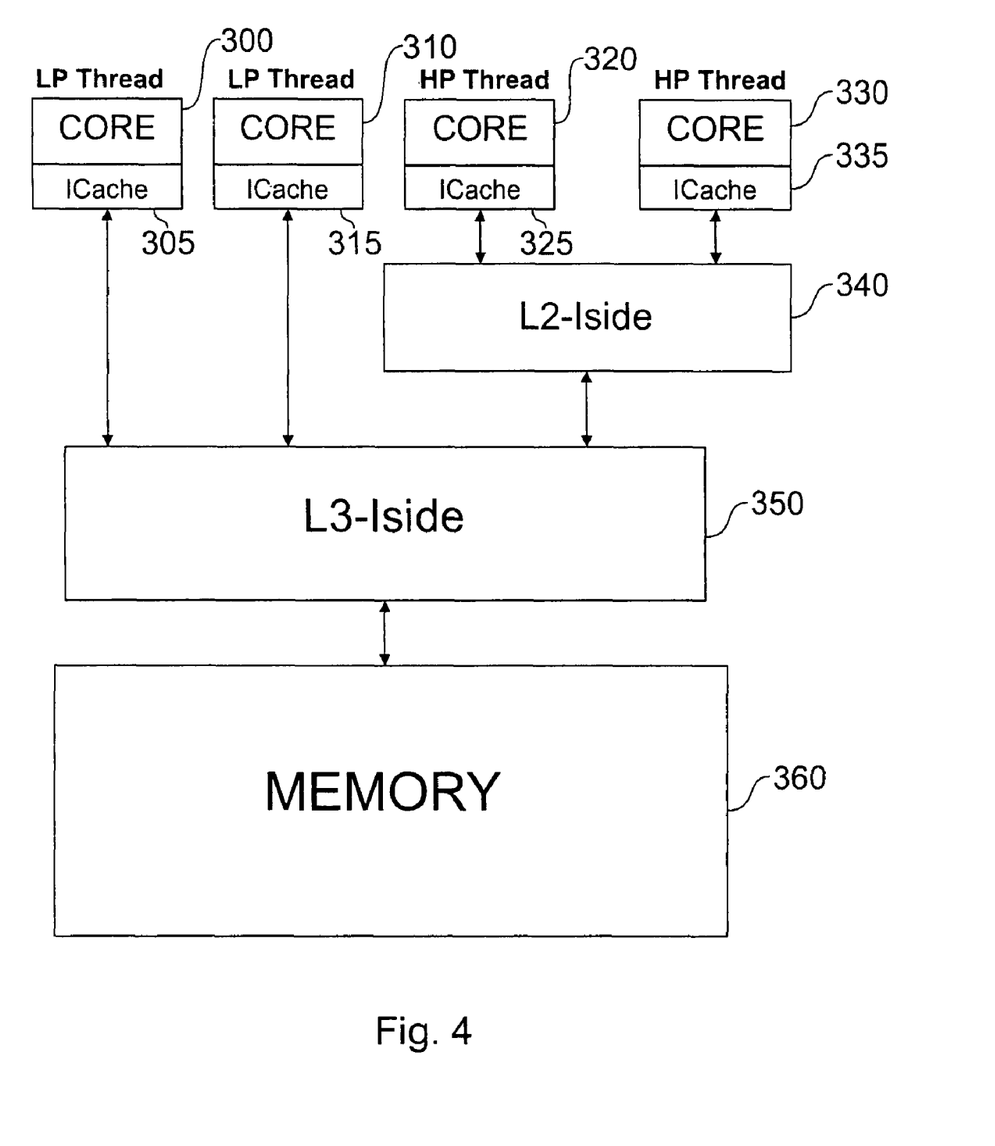
FIG. 4 schematically illustrates a cache memory hierarchy and multiple processor cores in accordance with one embodiment of the present invention, where each core is executing its own thread, some threads being low priority and some threads being high priority.

FIG. 4 illustrates a multiple core data processing system, such as a CMP system. In this example embodiment the four processor cores 300, 310, 320 and 330 are each executing a single thread, cores 300 and 310 executing LP threads and cores 320 and 330 executing HP threads. Furthermore, in this example each processor core has an associated instruction cache (305, 315, 325 and 335). The remainder of the cache memory hierarchy comprises an L2 instruction cache 340, and an L3 instruction cache 350, the cache memory hierarchy being coupled to main memory 360. An instruction access request for any given thread is first looked up in the instruction cache belonging to the core executing that thread. If the lookup misses there, then the lookup procedure proceeds to the shared caches. Instruction access requests from the cores executing HP threads first lookup in the instruction side of the L2 cache 340, before (if missing at L2) looking up in the L3 cache. For instruction access requests from the cores executing LP threads, if they miss in the instruction caches 305 or 315, the lookup procedure is performed directly in the L3 cache 350. Instruction access requests from all cores that miss at L3 are passed to main memory 360.

The arrangements illustrated in FIGS. 3 and 4, although advantageous for the reasons explained above, can still be enhanced in some embodiments. When the HP thread stalls, an instruction access request for the LP thread still omits a predetermined level of the cache memory hierarchy even though that predetermined cache level is not being used by the HP thread and is therefore in principle available for use by the LP thread.

Figure 5:
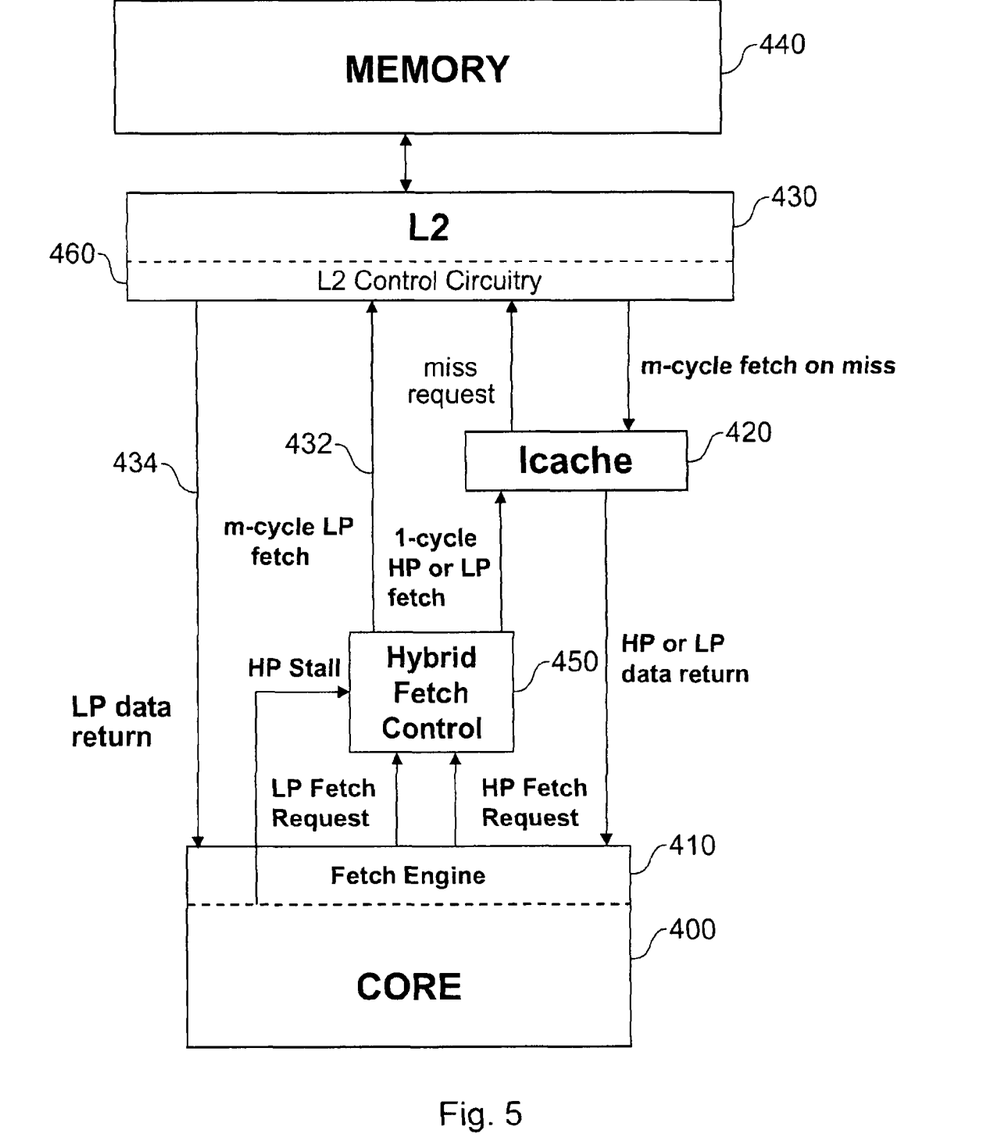
FIG. 5 schematically illustrates a cache memory hierarchy and a processor core, including a hybrid fetch control mechanism which determines, in accordance with one embodiment of the present invention, how the lookup for an instruction access request in the cache memory hierarchy is carried out.

FIG. 5 illustrates an alternative fetching mechanism for the SMT system of FIGS. 2 and 3 in which instruction access requests for the LP thread can also fetch from the instruction cache in the event of an HP thread stall. As before, the data processing apparatus consists of a processor core 400, a fetch engine 410, an instruction cache 420, an L2 cache 430 and a main memory 440. In addition however there is also a hybrid fetch control circuit 450, illustrated in FIG. 5 as a separate unit, but which may in fact form part of fetch engine 410. The hybrid fetch control 450 always directs instruction access requests from the HP thread to the instruction cache 420. How the hybrid fetch control 450 directs instruction access requests from the LP thread depends on the activity of the HP thread.

When the HP thread stalls the hybrid fetch control 450 allows instruction access requests for an LP thread to be passed to the instruction cache 420. If this LP fetch request hits in the instruction cache 420 then the instruction is returned directly from the instruction cache 420 to the processor core 400. If the LP fetch request misses in the instruction cache 420 and then hits in the L2 cache 430, then the L2 cache line is sent to the core using the dedicated LP data return path 434. Which path is used to return instructions to the core 400 is controlled by the L2 control circuitry 460. In addition, the cache line may in one embodiment also be allocated into the instruction cache 420, if the HP thread is still stalled. However, high priority thread cache lines in the instruction cache 420 may still be chosen to take priority over low priority thread cache lines and, in this example, an instruction cache line may be allocated for a low priority thread instruction if there is an available cache line or another low priority thread cache line (i.e. a cache line already storing instructions for the low priority thread) in the instruction cache 420. If all cache lines are high priority thread cache lines, then no allocation is made in the instruction cache 420 for the LP thread requested instruction.

If the HP thread is not stalled, then the hybrid fetch control 450 directs the LP fetch request directly to L2 cache 430 over path 432. In this case, as well as returning the requested instruction over path 434 a cache line containing that fetched instruction from L2 cache 430 can also be allocated into the instruction cache 420. Alternatively it may be chosen by the system designer not to allocate LP requested instructions to the instruction cache at all in this situation. If this allocation does occur then as before the allocation preferentially occurs where a line is available or failing that where a low priority cache line exists. If all cache lines in the instruction cache belong to high priority threads then no allocation of low priority thread requested instructions occurs.

In general, the allocation into the instruction cache 420 of cache lines for LP thread requested instructions may bring performance enhancing benefits when the typical time period over which the HP thread stalls is significantly longer than the time it takes for several instruction access request from the LP thread to access the instruction cache 420. When this is the case the performance benefit for the LP threads may be gained whilst the HP thread is stalled.

A further feature of the L2 control circuitry 460 is the arbitration between access requests to the L2 cache 430. For example, if an HP fetch request misses in the instruction cache 420, the instruction access request is passed to L2 cache 430. Some delay for the HP thread may then result if the L2 cache is already handling an LP instruction fetch request passed directly to L2 cache 430 from hybrid fetch control 450. This can happen if the L2 cache 430 is a blocking cache or the miss queue of the L2 cache (part of the L2 control circuitry 460) is shared in a non-blocking L2 cache.

If the L2 cache 430 is a blocking cache, a potential solution is to allow the LP access request to access the L2 cache if and only if the HP access request hits in the instruction cache 420. As soon as the hit signal is received by the fetch engine 410 the L2 instruction fetch request is initiated for the LP thread. If the HP access request misses in the instruction cache, the LP access request will not be allowed to proceed to the L2 cache, so as to not steal the L2 bandwidth from the HP thread.

If the L2 cache 430 is non-blocking then a separate miss queue may be administered for each thread priority by L2 control circuitry 460. If separate miss queues are not feasible then the solution proposed for the blocking L2 cache can be used in this case as well.

Figure 6:
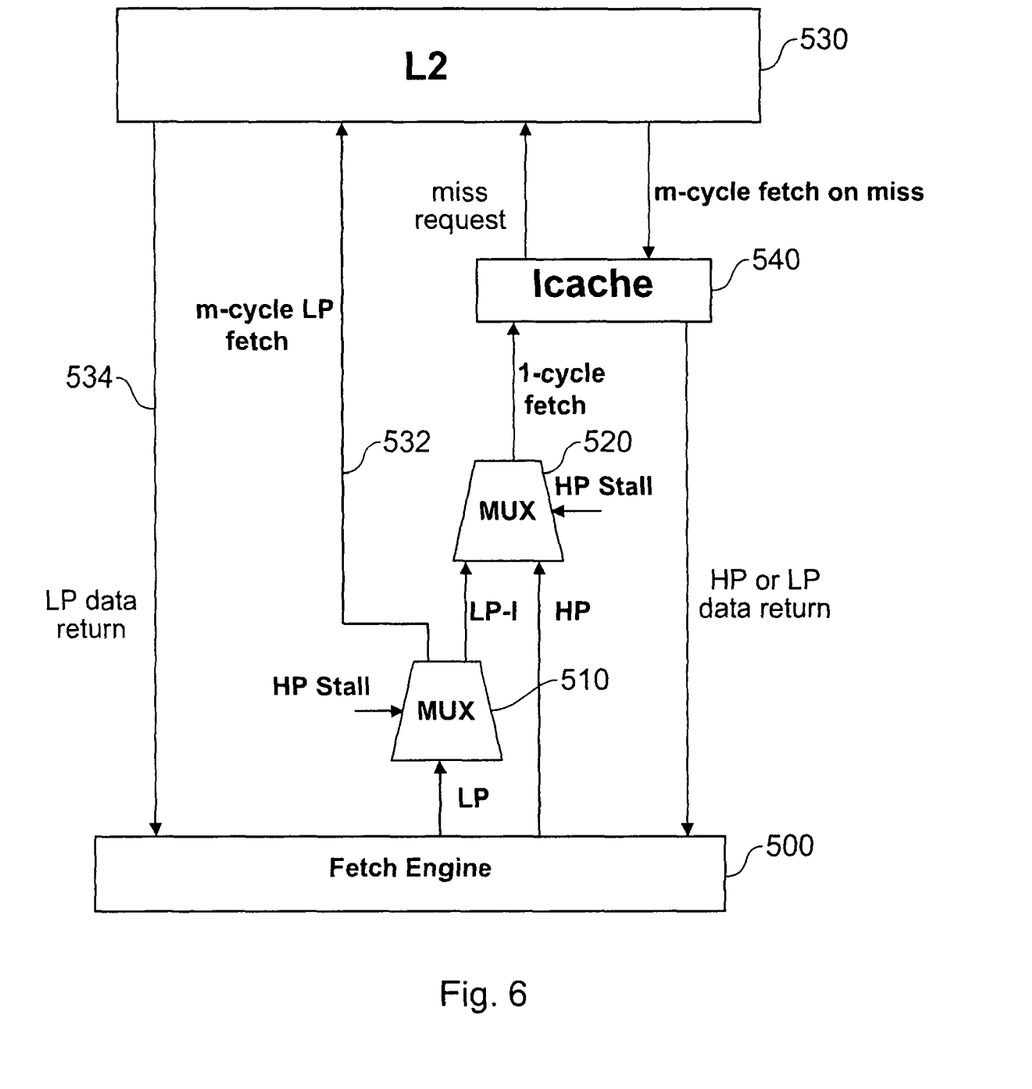
FIG. 6 schematically illustrates an example arrangement of the hybrid fetch control mechanism of FIG. 5.

FIG. 6 illustrates a simplified version of FIG. 5 giving an example embodiment of hybrid fetch control 450. LP instruction fetch requests from fetch engine 500 are passed to multiplexer 510 which is controlled by the HP thread stall signal. If the HP thread stall signal is not set the LP instruction access request is passed to L2 cache 530 over path 532. If however the HP thread stall signal is set, then the LP instruction access request is passed to second multiplexer 520. Multiplexer 520 is also controlled by the HP stall signal and hence in this instance the LP instruction access request is passed from multiplexer 520 to instruction cache 540. Fetch engine 500 passes HP instruction access requests directly to multiplexer 520 and if the HP stall signal is not set then multiplexer 520 passes the HP instruction access request to instruction cache 540.

Since it takes multiple cycles (m-cycles) to access the L2 cache, the instructions for the LP thread are fetched every m-cycles. In the light of this, one concern is the cost of the dedicated path between the L2 cache and the processor core. It should be noted that this path does not have to be one L2 cache line width since the dedicated path connects the L2 to the core and the width of the path can be limited to the fetch bandwidth of the core. For instance, if the L2 cache line size is 512 bits wide and the core can fetch two 32-bit instructions per cycle then a 64-bit bus interface between the L2 cache and the core suffices.

In fact, the core may fetch only one instruction (critical instruction first) at a time to further reduce the dedicated path to a 32-bit interface. However, since instruction addresses have sequential locality further instruction fetch requests will try to access the same L2 cache line to fetch consecutive instructions. This increases the energy consumption through repeated reading of the same L2 cache line and because the L2 cache has higher associativity, more tags will be compared every time a new access request is processed by the L2 cache.

Figure 7:
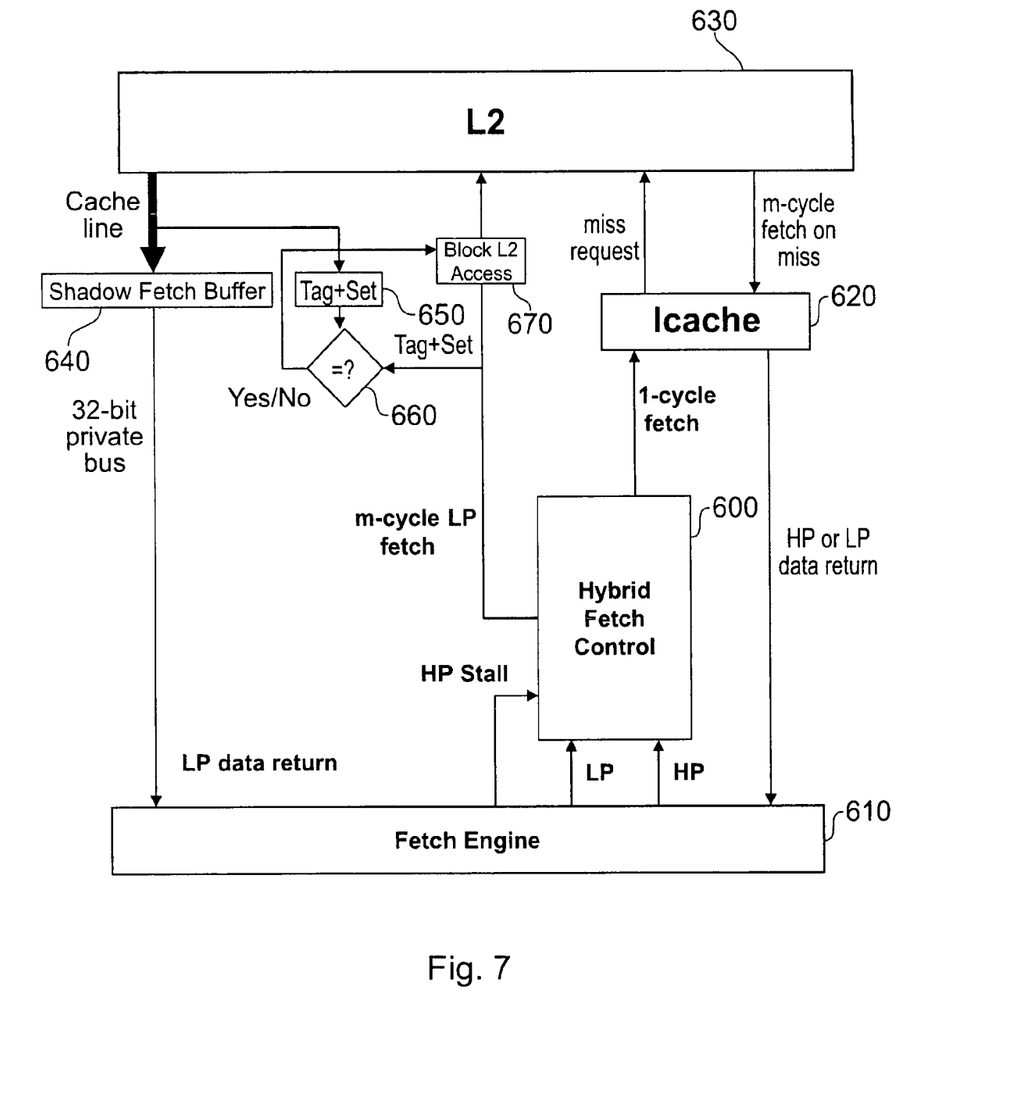
FIG. 7 schematically illustrates a cache memory hierarchy in accordance with one embodiment of the present invention, including a shadow fetch buffer.

FIG. 7 illustrates an arrangement designed to address this problem. As in FIG. 5 a hybrid fetch control 600 directs instruction access requests received from a fetch engine 610 either to an instruction cache 620 or to an L2 cache 630. In order to avoid unnecessary repeated reading of the same L2 cache line, the first time an L2 cache line in L2 cache 630 is read for a low priority thread, it is first read into shadow fetch buffer 640, which is of L2 cache line size. The first requested instruction (the critical instruction) is sent down the 32 bit private bus to fetch engine 610 and from there is provided to the thread requesting it. The cache line address (i.e. the tag and set portions of the instruction address) is also stored in register 650 so that when the next LP instruction address arrives at the L2 cache, first the tag and set portions of the address specified by the incoming request are compared by comparator 660 to the tag and set portions associated with the shadow fetch buffer in register 650. If there is a match, the L2 cache is not accessed (block 670) because the shadow fetch buffer already has the required instruction in the buffered cache line and the required instruction is sent directly to the core on the 32-bit private bus. The arrangement illustrated in FIG. 7 therefore contributes both to performance enhancement (by passing subsequent instructions back to the core without needing to read an L2 cache line) and energy savings (by reducing the number of times L2 cache line reads occur).

Figure 8:
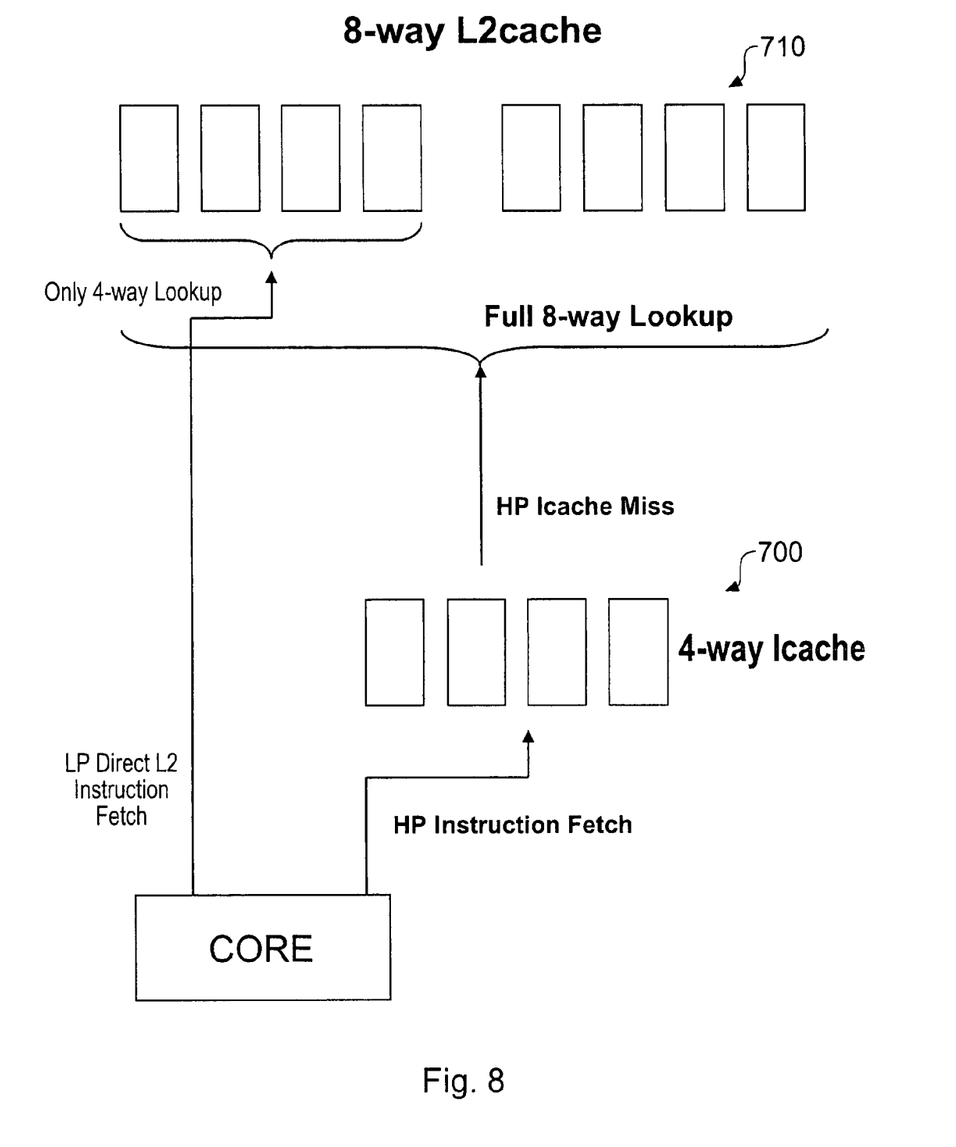
FIG. 8 schematically illustrates low priority instruction fetch only accessing part of an 8-way L2 cache in accordance with one embodiment of the present invention.

L2 caches generally have more cache ways than instruction caches and hence performing LP thread instruction fetching directly from the L2 cache can increase the energy expended making tag comparisons. One way of reducing the L2 tag comparison energy consumption is to restrict the instructions of the low priority thread(s) to only be stored in a certain limited number of the L2 cache ways when a linefill occurs from memory, and then it is only necessary to perform a lookup in those certain number of L2 cache ways rather than doing a full way search. For instance, as illustrated in FIG. 8, if the instruction cache 700 has four ways and the L2 cache 710 has eight ways then the LP thread direct instruction fetch request may be arranged to look up in only the first four ways in the L2 cache so that the energy consumption of the L2 instruction fetch for the LP thread is the same as the energy consumption of the L1 instruction cache. The second half of the L2 cache 710 is disabled by control logic so that it does not participate in the tag comparison. Other L2 cache accesses such as those coming via the instruction cache 700 will be normal i.e. performing a lookup in the full eight ways.

Where the hybrid fetch control (illustrated in FIGS. 5, 6 and 7) is implemented, the configuration of FIG. 8 may create replications of cache lines and therefore contribute to the degradation of the performance of the system. This is because instruction cache misses from LP thread instruction access requests can allocate cache lines in the second half of the L2 cache. After this has happened the LP L2 direct instruction fetch will not lookup in the second half of the L2 cache and may retrieve the line from main memory even though the same line may exist in the second half of the L2 cache. This can reduce the performance of the LP thread as well as the overall L2 cache bandwidth.

Figure 9:
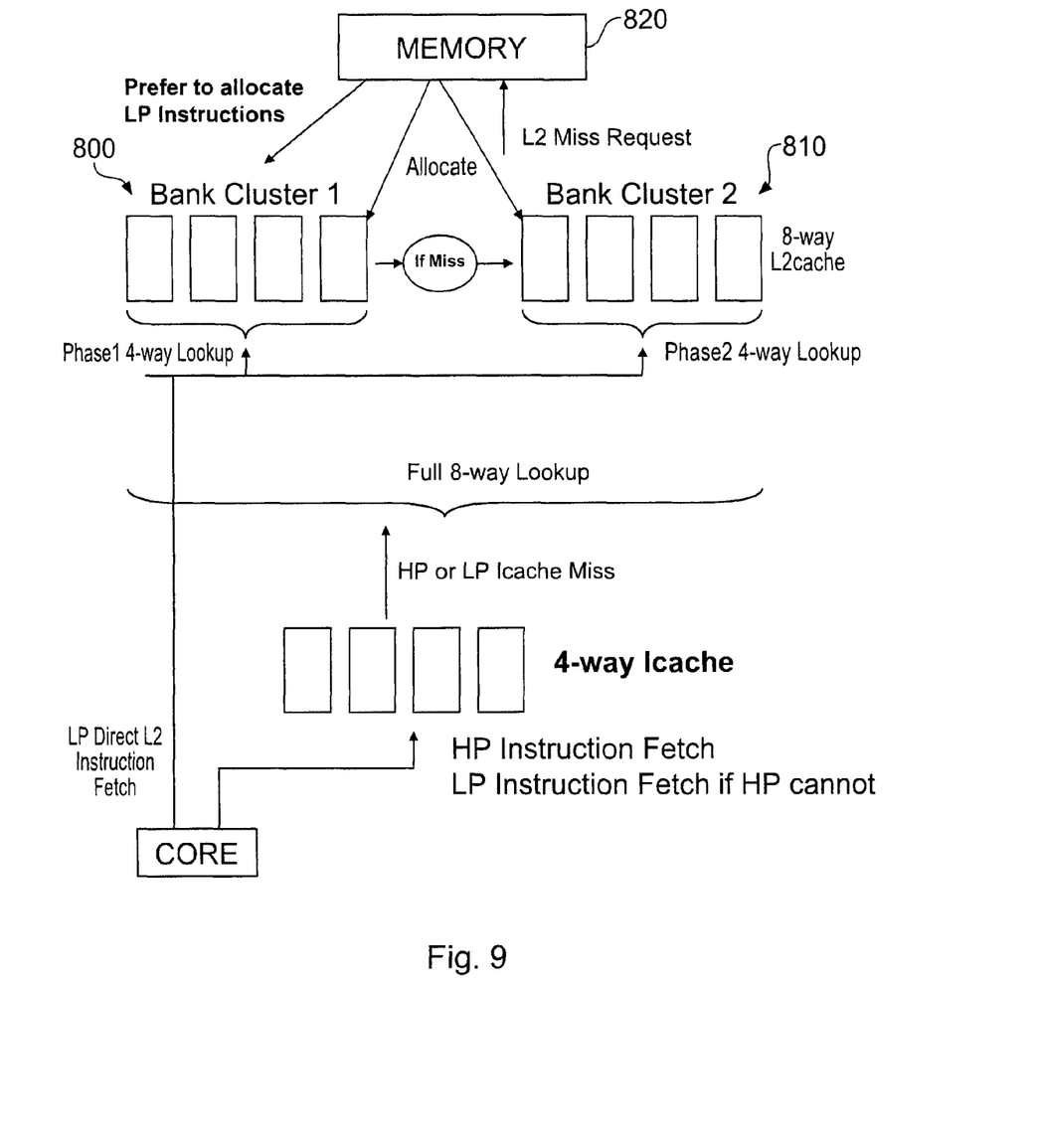
FIG. 9 schematically illustrates a two phase lookup of an 8-way L2 cache by low priority instruction access requests in accordance with one embodiment of the present invention.

To address this issue a two phase LP L2 direct instruction fetch mechanism as illustrated in FIG. 9 may be used. Here the LP direct L2 instruction fetch is performed in two phases. In the first phase the first four ways (the first bank cluster) 800 are accessed. If this access misses, then the second four ways (the second bank cluster) 810 are accessed. If the access request also misses in the second bank cluster 810, then the allocation to L2 from main memory 820 is preferred to be allocated to the first bank cluster 800 rather than the second bank cluster 810, so that the probability of hitting in the first bank cluster is increased for later L2 direct instruction fetch requests from LP threads.

From the above described embodiments it will be appreciated that the present invention provides a system in which both high priority and low priority threads can fetch simultaneously, such that a high priority thread is not held up by the fetching of instructions for low priority threads, yet low priority threads can still achieve useful instruction throughput.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
processing circuitry for executing multiple program threads including at least one high priority thread and at least one lower priority thread; and
a cache memory hierarchy comprising multiple cache levels for storing instructions required for said program threads, wherein responsive to the processing circuitry issuing an access request specifying an address of an instruction required for one of said program threads, the cache memory hierarchy performs a lookup procedure to determine if that instruction is stored within the cache memory hierarchy, said cache memory hierarchy having a bypass path for omitting a predetermined level of said cache memory hierarchy from said lookup procedure and for bypassing said predetermined level of the cache memory hierarchy when returning said required instruction to said processing circuitry, said bypass path being used by default when said access request is for an instruction required for said at least one lower priority thread.

2. A data processing apparatus as claimed in claim 1, wherein said processing circuitry comprises a processor core executing said multiple program threads.

3. A data processing apparatus as claimed in claim 1, wherein said processing circuitry comprises multiple processor cores, each processor core executing one or more of said multiple program threads.

4. A data processing apparatus as claimed in claim 1, wherein said predetermined level is a cache level that is first accessed during said lookup procedure.

5. A data processing apparatus as claimed in claim 1, wherein said processing circuitry includes fetch circuitry for issuing access requests to said cache memory hierarchy, the fetch circuitry determining for each access request whether the bypass path is to be used or not.

6. A data processing apparatus as claimed in claim 5, wherein if at a time an access request is to be issued for an instruction required by said at least one lower priority thread, said at least one high priority thread is stalled, said fetch circuitry causes said lookup procedure for that access request to be performed without use of said bypass path.

7. A data processing apparatus as claimed in claim 1, wherein when said instruction required for said at least one lower priority thread is being returned by said cache memory hierarchy to said processing circuitry, then if predetermined criteria exist that instruction is allocated into said predetermined level of the cache hierarchy.

8. A data processing apparatus as claimed in claim 1, wherein said bypass path further comprises a shadow fetch buffer associated with a cache level of the cache memory hierarchy for buffering a cache line read from that cache level in response to a first access request, such that if a subsequent access request specifies an address of an instruction within that cache line, that instruction is returned over the bypass path without requiring a further access to that cache level.

9. A data processing apparatus as claimed in claim 1, wherein instructions required for said at least one lower priority thread, when stored in a further predetermined level of the cache memory hierarchy, are only stored in a first part of said further predetermined level of the cache memory hierarchy, and said lookup procedure only examines said first part of said further predetermined level of the cache memory hierarchy when said access request is for an instruction required for said at least one lower priority thread.

10. A data processing apparatus as claimed in claim 1, wherein instructions required for said at least one lower priority thread, when stored in a further predetermined level of the cache memory hierarchy, are preferentially stored in a first part of said further predetermined level of the cache memory hierarchy, said lookup procedure first examining said first part of said further predetermined level of the cache memory hierarchy when said access request is for an instruction required for said at least one lower priority thread, and said lookup procedure only examining a further part of said further predetermined level of the cache memory hierarchy when said access request is for an instruction required for said at least one lower priority thread if said instruction is not found in said first part.

11. A data processing apparatus comprising:
processing means for executing multiple program threads including at least one high priority thread and at least one lower priority thread;
cache memory hierarchy means including multiple cache levels for storing instructions required for said program threads and, responsive to the processing means issuing an access request specifying an address of an instruction required for one of said program threads, for performing a lookup procedure to determine if that instruction is stored within the cache memory hierarchy means, said cache memory hierarchy means having a bypass path means for omitting a predetermined level of said cache memory hierarchy means from said lookup procedure and for bypassing said predetermined level of the cache memory hierarchy means when returning said required instruction to said processing circuitry, said bypass path means for use by default when said access request is for an instruction required for said at least one lower priority thread.

12. A method of handling access requests in a data processing apparatus comprising the steps of:
executing multiple program threads including at least one high priority thread and at least one lower priority thread;
storing instructions required for said program threads in a cache memory hierarchy comprising multiple cache levels;
performing, in response to an access request specifying an address of an instruction required for one of said program threads, a lookup procedure to determine if that instruction is stored within the cache memory hierarchy; and
selectively omitting a predetermined level of said cache memory hierarchy from said lookup procedure and from a path used to return said required instruction, said omitting step being selected by default when said access request is for an instruction required for said at least one lower priority thread.

* * * * *